United States Patent
Nishiura

(10) Patent No.: US 10,886,843 B2
(45) Date of Patent: Jan. 5, 2021

(54) ELECTRIC POWER SUPPLYING SYSTEM

(71) Applicant: TOSHIBA MITSUBISHI-ELECTRIC INDUSTRIAL SYSTEMS CORPORATION, Chuo-ku (JP)

(72) Inventor: Hiroki Nishiura, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 16/708,784

(22) Filed: Dec. 10, 2019

(65) Prior Publication Data
US 2020/0280254 A1    Sep. 3, 2020

(30) Foreign Application Priority Data
Feb. 28, 2019 (JP) .................. 2019-036431

(51) Int. Cl.
*H02M 3/156* (2006.01)
*H02M 5/458* (2006.01)
*H02M 7/493* (2007.01)
*H02M 7/04* (2006.01)

(52) U.S. Cl.
CPC .......... *H02M 3/156* (2013.01); *H02M 5/458* (2013.01); *H02M 7/04* (2013.01); *H02M 7/493* (2013.01)

(58) Field of Classification Search
CPC .. H02M 3/1582; H02M 3/1584; H02M 3/285; H02M 3/33561; H02M 7/49; H02M 1/045
See application file for complete search history.

(56) References Cited

U.S. PATENT DOCUMENTS

| 2015/0061392 A1* | 3/2015 | Berard | H02M 7/493 |
| | | | 307/52 |
| 2017/0163086 A1* | 6/2017 | Bach | H02J 9/061 |
| 2018/0301930 A1* | 10/2018 | Gonzalez | H02J 9/062 |

FOREIGN PATENT DOCUMENTS

JP    2017-50933 A    3/2017

* cited by examiner

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

An electric power supplying system includes a plurality of AC output converters connected in parallel to a bus configured to supply power to an AC load. Each of the AC output converters includes: an AC-DC converter; a DC-AC converter; a secondary battery connected in parallel to the DC-AC converter; a first switching circuit provided between the bus and the DC-AC converter; a bypass path, a second switching circuit provided between the bus and the bypass path; a switching control circuit configured to control the first and second switching circuits at the time of power failure and power restoration; and a control power supply circuit configured to receive a supply of the external AC voltage, the AC voltage converted by the DC-AC converter, a bypass voltage of the bypass path, and a voltage of the bus, to generate a control voltage for the switching control circuit.

3 Claims, 4 Drawing Sheets

ELECTRIC POWER SUPPLYING SYSTEM

BACKGROUND OF THE INVENTION

Field of the Invention

The present invention relates to an electric power supplying system including a plurality of AC output converters connected in parallel and configured to convert power from direct-current (DC) to alternating-current (AC), for supplying the power to a load.

DESCRIPTION OF THE BACKGROUND ART

There is known an electric power supplying system including a plurality of AC output converters connected in parallel and configured to convert power from DC to AC, for supplying the power to a load.

In this respect, Japanese Patent Laying-Open No. 2017-50933 discloses an electric power supplying system including a plurality of AC output converters such as inverters connected in parallel, which are operated in parallel with respect to a common load.

SUMMARY OF THE INVENTION

While the electric power supplying system in the aforementioned publication is capable of feeding power with a high degree of efficiency by supplying power from the respective AC output converters to the load, the system is configured to switch to a bypass circuit when a power failure occurs, for example.

After a power failure has occurred, however, the respective AC output converters may have different power supplying capacities from a storage battery to the load.

In that case, if some of the AC output converters switch to the bypass circuit while the other AC output converters continue to feed power from the storage battery, there is a risk of backflow. It is thus required to switch to the bypass circuit upon completion of power feeding from all the AC output converters.

However, power supplies of some of the AC output converters do not always operate normally until after the completion of power feeding from the other AC output converters. This may result in difficulty in switching to the bypass circuit.

If the switching to the bypass circuit could not be normally performed, the electric power supplying system may not be restored when the power is restored.

An object of the present invention is to realize an electric power supplying system capable of safely switching to a bypass circuit when a power failure occurs, to solve the problem described above.

An electric power supplying system according to one aspect of the present invention includes a plurality of AC output converters connected in parallel to a bus configured to supply power to an AC load. Each of the AC output converters includes: an AC-DC converter configured to convert an external AC voltage into a DC voltage; a DC-AC converter configured to convert the DC voltage into an AC voltage and supply the AC voltage to the bus; a secondary battery connected in parallel to the DC-AC converter and configured to store the DC voltage; a first switching circuit provided between the bus and the DC-AC converter; a bypass path configured to directly supply the external AC voltage, instead of the AC voltage supplied from the DC-AC converter, to the bus; a second switching circuit provided between the bus and the bypass path; a switching control circuit configured to control the first and second switching circuits at the time of power failure and power restoration; and a control power supply circuit configured to receive a supply of the external AC voltage, the AC voltage converted by the DC-AC converter, a bypass voltage of the bypass path, and a voltage of the bus, to generate a control voltage for the switching control circuit.

Preferably, the switching control circuit of each of the AC output converters is configured to turn the first switching circuit on and turn the second switching circuit off during normal operation.

Preferably, the switching control circuit of each of the AC output converters is connected to the switching control circuits of the other AC output converters, and is configured to receive an input of a signal to stop a voltage to the AC load from the other AC output converters, and to turn the first switching circuit off and turn the second switching circuit on upon receiving the input of the signal to stop the voltage to the AC load for all of the AC output converters.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment is described below based on the drawings. In this example, an uninterruptible power supply (UPS) system is described as an example electric power supplying system.

In this embodiment, the uninterruptible power supply system is described using a parallel configuration of a plurality of AC output converters.

Figure 1:
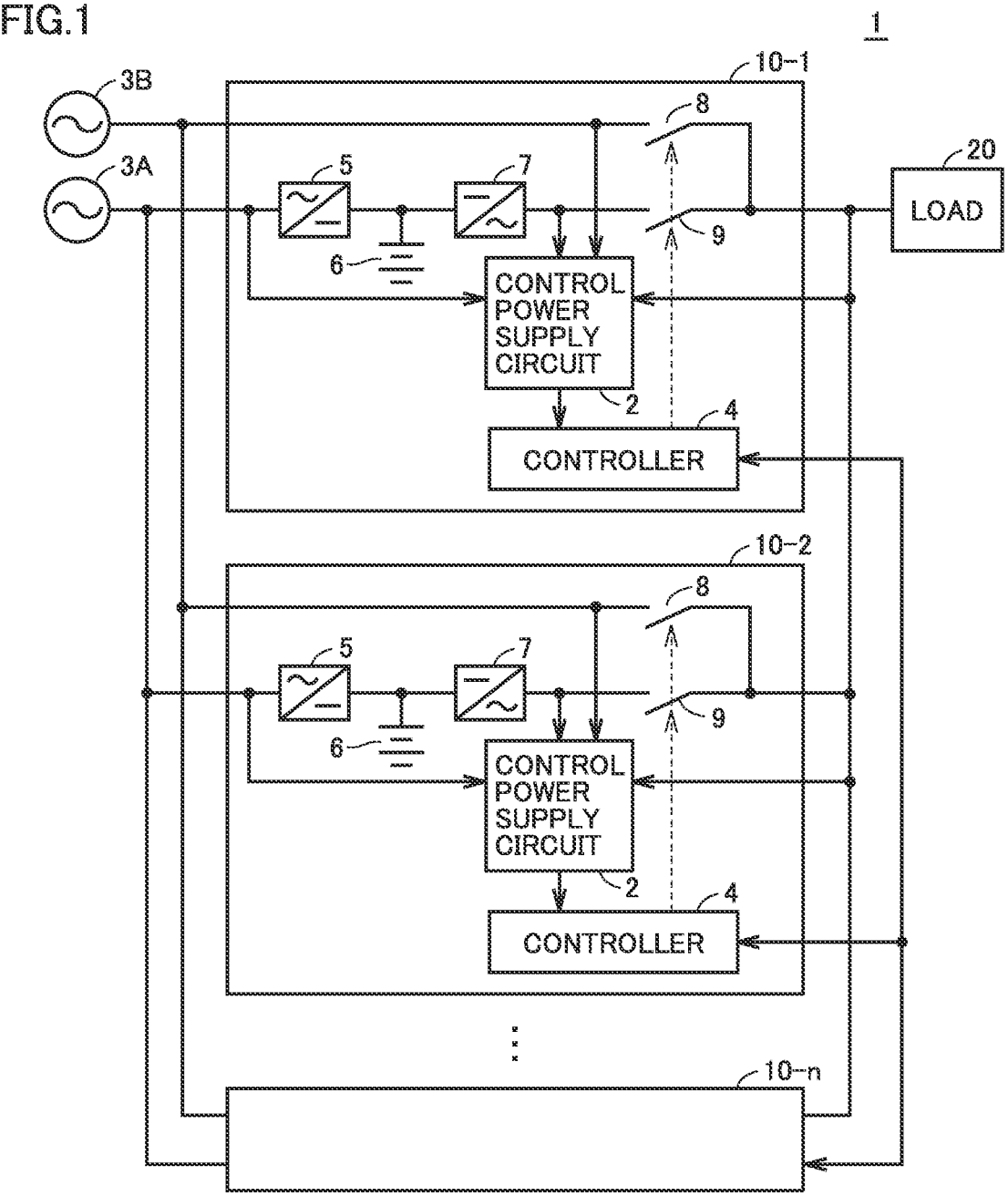
FIG. 1 illustrates the configuration of an uninterruptible power supply system 1 based on an embodiment.

FIG. 1 illustrates the configuration of an uninterruptible power supply system 1 based on the embodiment.

Referring to FIG. 1, uninterruptible power supply system 1 includes a plurality of (n) AC output converters 10-1 to 10-$n$. AC output converters 10-1 to 10-$n$ (also collectively referred to as AC output converters 10) are connected to an external AC power supply 3A and an external bypass AC power supply 3B, and are operated in parallel with respect to a common load 20. It should be noted that n can be set to any number depending on the load supplied, as long as the number is particularly two or more.

The configuration of each AC output converter 10 is now described.

AC output converter 10 includes: a converter 5 connected to external AC power supply 3A and configured to convert an AC voltage from external AC power supply 3A into a DC voltage; an inverter 7 connected to converter 5 and configured to convert the DC voltage into an AC voltage; and a storage battery 6 connected to converter 5 in parallel with inverter 7.

AC output converter 10 further includes: a switching circuit 9 provided between inverter 7 and the load; a bypass path provided separately from a path on which converter 5 and inverter 7 are supplied, and configured to supply an AC voltage from external bypass AC power supply 3B; a switching circuit 8 provided between the bypass path and the load; a controller 4 (switching control circuit) configured to control switching circuits 8 and 9; and a control power supply circuit 2 configured to generate a driving voltage for controller 4.

Control power supply circuit 2 is connected to the input side of converter 5, the output side of inverter 7, external bypass AC power supply 3B, and a bus connected to load 20, and is configured to detect their respective AC voltages and receive a supply of the AC voltages to generate the driving voltage for controller 4. That is, control power supply circuit 2 can generate the driving voltage based on the AC voltage supplied from inverter 7, even when a power failure occurs in external AC power supply 3A.

In accordance with the AC voltage detected on the input side of converter 5 and the output side of inverter 7, control power supply circuit 2 outputs, to controller 4, a signal indicating the detection of a power failure or a reduction in supply voltage from inverter 7.

When external AC power supply 3A stops supplying the power due to a power failure, power is supplied from storage battery 6 to the load.

Control power supply circuit 2 is described as being connected to the input side of converter 5, the output side of inverter 7, external bypass AC power supply 3B, and the bus connected to load 20, to generate the necessary driving voltage. However, since the voltages supplied from the input side of converter 5, the output side of inverter 7, external bypass AC power supply 3B, and the bus connected to load 20 vary in level, a transformer circuit configured to appropriately adjust and supply the voltages is provided, which is not shown.

Figure 2:
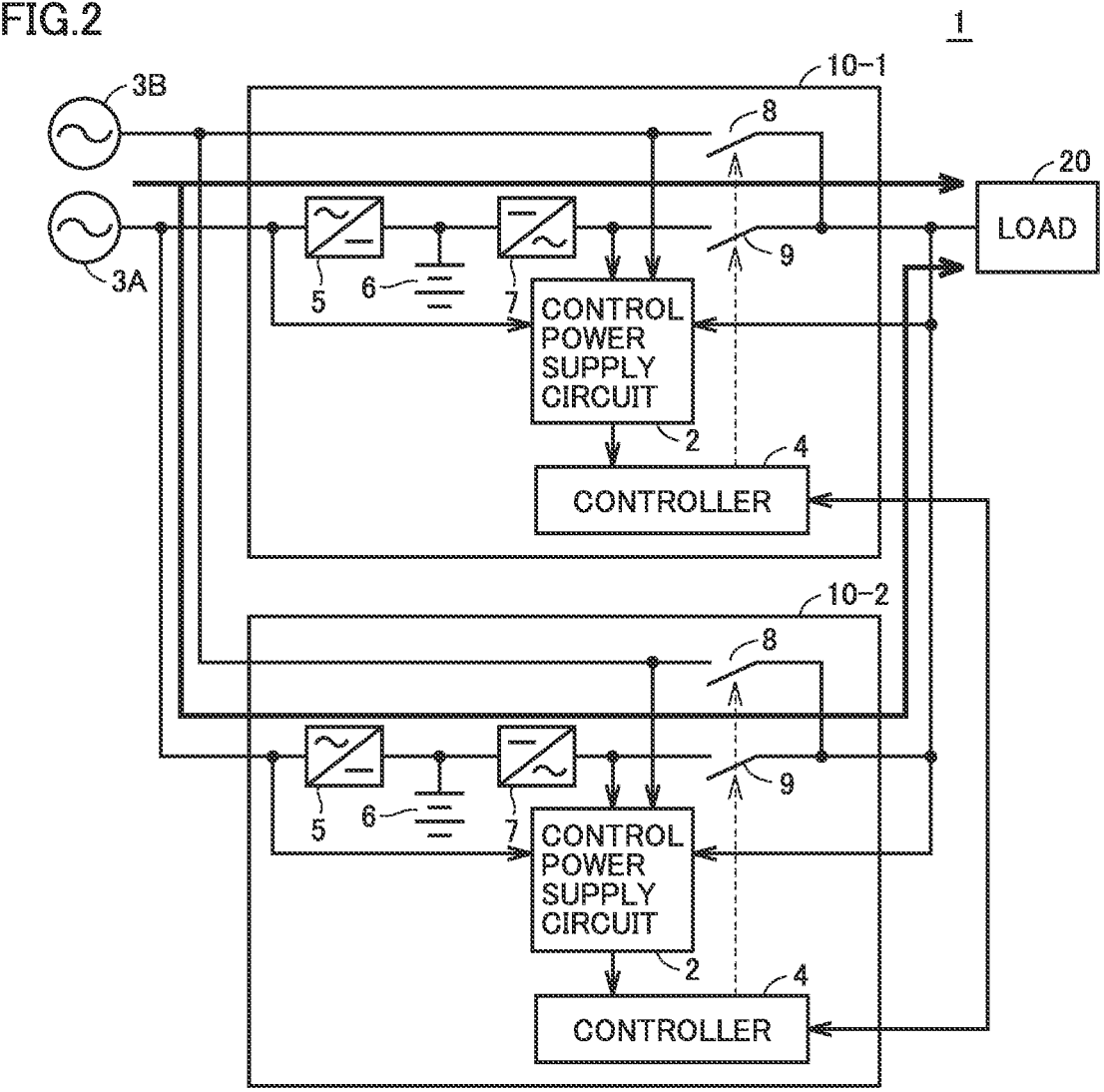
FIG. 2 illustrates voltage supply in uninterruptible power supply system 1 during normal operation based on the embodiment.

FIG. 2 illustrates voltage supply in uninterruptible power supply system 1 during normal operation based on the embodiment.

As shown in FIG. 2, a configuration including two AC output converters 10-1 and 10-2 is described by way of example.

During normal operation of external AC power supply 3A, switching circuit 9 is turned on to connect load 20 and inverter 7 to each other.

Converter 5 converts an AC voltage from external AC power supply 3A into a DC voltage. Inverter 7 is connected to converter 5 and converts the DC voltage into an AC voltage. Storage battery 6 stores the DC voltage converted by converter 5.

Power is supplied from inverter 7 to load 20 through switching circuit 9.

Since the plurality of AC output converters 10 are configured in parallel, necessary power is supplied from respective AC output converters 10 to load 20.

Figure 3A:
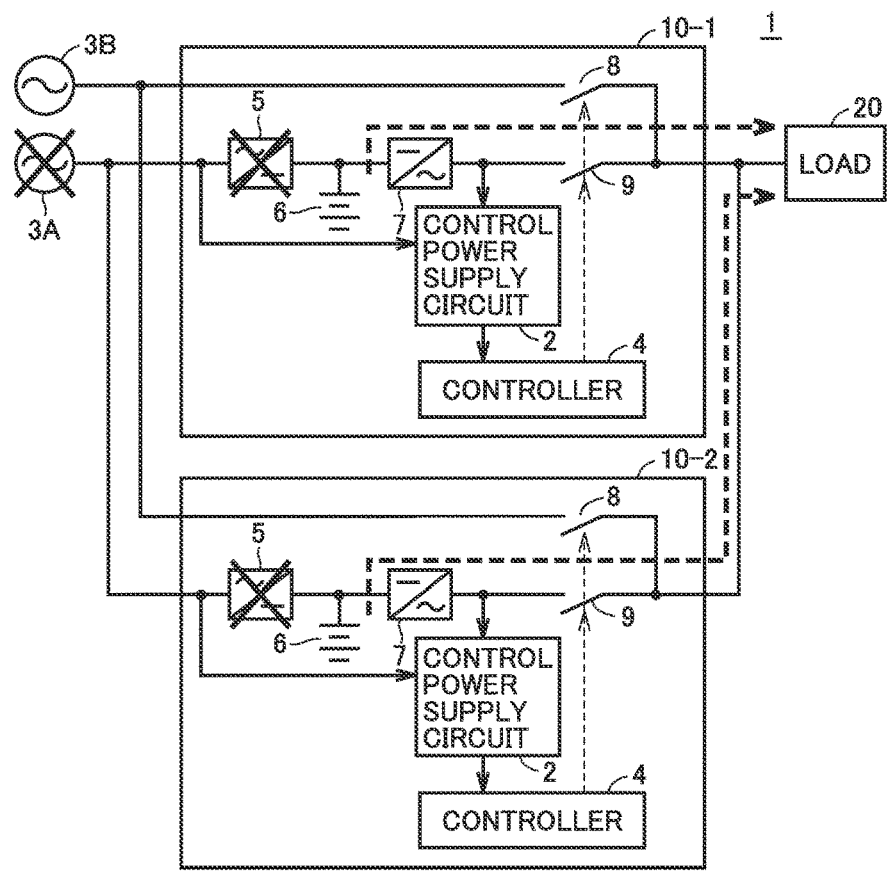
FIGS. 3A and 3B illustrate voltage supply in uninterruptible power supply system 1 at the time of conventional power failure.
Figure 3B:
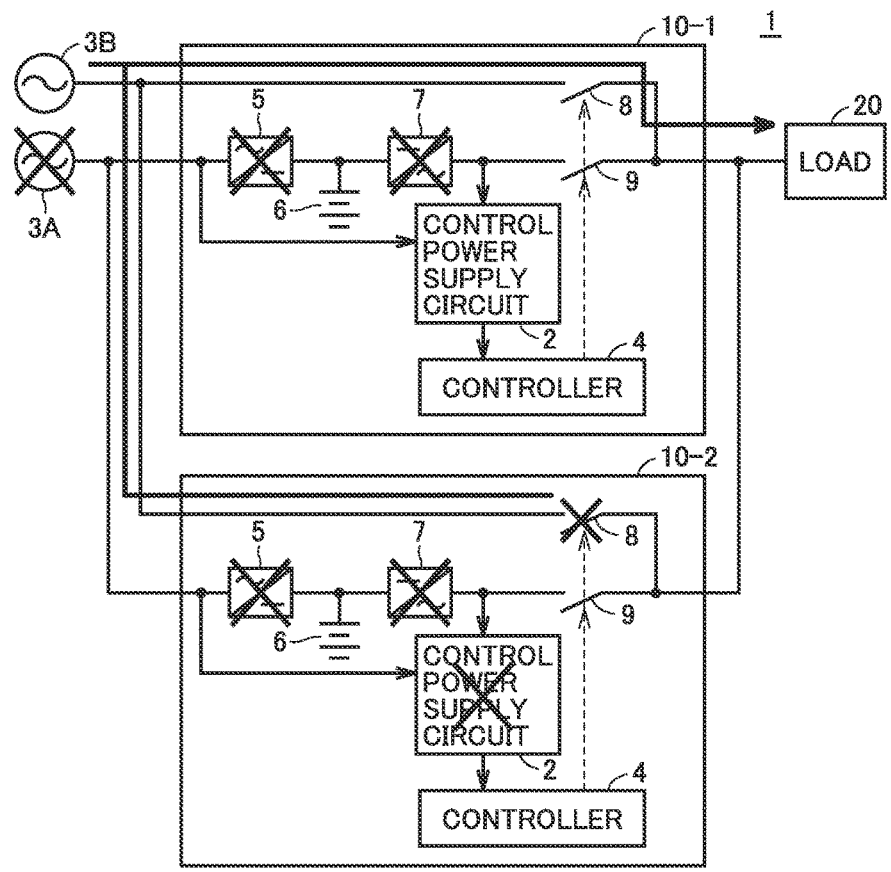

FIGS. 3A and 3B illustrate voltage supply in uninterruptible power supply system 1 at the time of conventional power failure.

As shown in FIG. 3A, a configuration including two AC output converters 10-1 and 10-2 is described by way of example.

The case in which a power failure has occurred in external AC power supply 3A is described. In this case, the voltage supply from converter 5 decreases. Thus, the power supply to load 20 is continued from storage battery 6 through inverter 7 and switching circuit 9. Switching circuit 8 is OFF in this state.

During normal operation, switching circuit 9 is turned on to connect load 20 and inverter 7 to each other.

Converter 5 converts an AC voltage from external AC power supply 3A into a DC voltage. Inverter 7 is connected to converter 5 and converts the DC voltage into an AC voltage. Storage battery 6 stores the DC voltage converted by converter 5.

Power is supplied from inverter 7 to load 20 through switching circuit 9.

Since the plurality of AC output converters 10 are configured in parallel, necessary power is supplied from respective AC output converters 10 to load 20.

Next, the case in which storage battery 6 of AC output converter 10-1 and storage battery 6 of AC output converter 10-2 have different supplying capacities is described.

In this example, the case in which storage battery 6 of AC output converter 10-1 has greater supplying capacity than storage battery 6 of AC output converter 10-2 is described.

In this case, even if the supply from storage battery 6 of AC output converter 10-2 to load 20 stops, there is a risk of backflow when continuing the supply from AC output converter 10-1 to load 20. Thus, switching circuit 8 of AC output converter 10-2 cannot be turned on.

Therefore, AC output converter 10-2 needs to wait for a command to switch from switching circuit 9 to switching circuit 8 until after the supply from AC output converter 10-1 to load 20 ends.

During this waiting period, control power supply circuit 2 needs to continue to ensure the driving voltage for controller 4. If the waiting period is long, however, it may be difficult for control power supply circuit 2 to continue to ensure the driving voltage for controller 4. If control power supply circuit 2 can no longer ensure the driving voltage for controller 4, the command to switch from switching circuit 9 to switching circuit 8 cannot be output, causing switching circuit 8 to be maintained in an OFF state.

FIG. 3B shows the case in which the power has been restored when switching circuit 9 of AC output converter 10-1 is ON and switching circuit 8 of AC output converter 10-2 is OFF.

In this case, switching circuit 8 of AC output converter 10-1 is ON, and thus power is supplied to load 20 through the bypass path.

On the other hand, switching circuit 8 of AC output converter 10-2 is OFF, and thus power cannot be supplied to load 20 through the bypass path.

As a result, only AC output converter 10-1 supplies power to load 20, to reach a state of overload. Thus, the supply from AC output converter 10-1 will also stop.

That is, a conventional uninterruptible power supply system may not be able to perform a normal power restoration process.

Figure 4A:
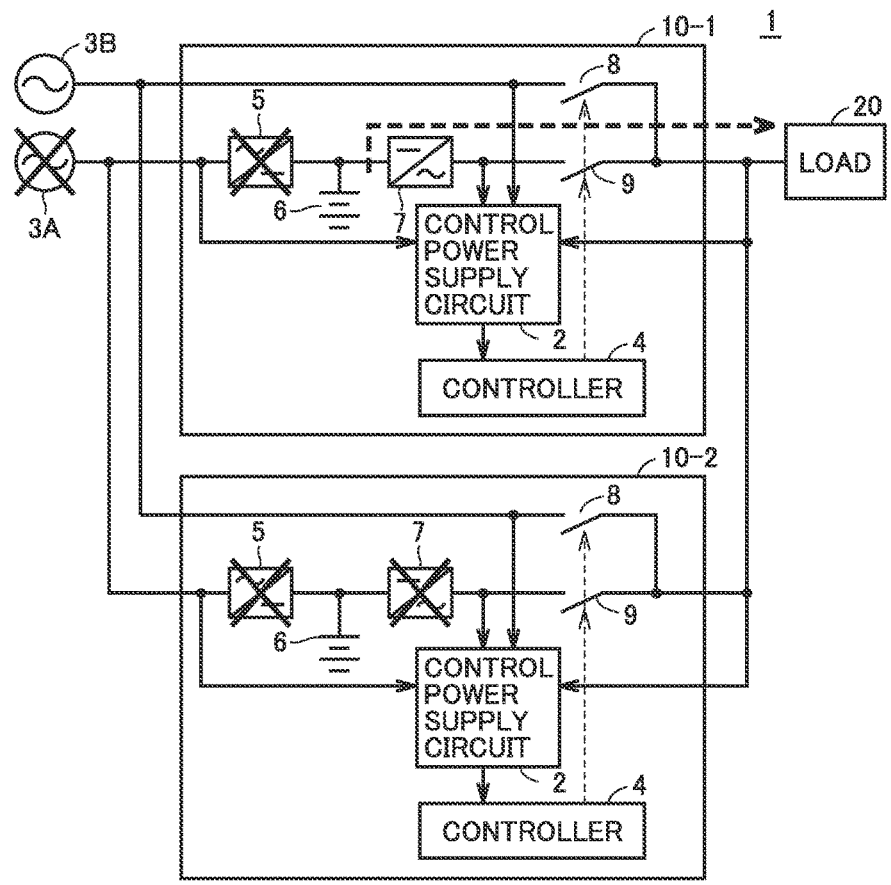
FIGS. 4A and 4B illustrate voltage supply in uninterruptible power supply system 1 at the time of power failure according to the embodiment.
Figure 4B:
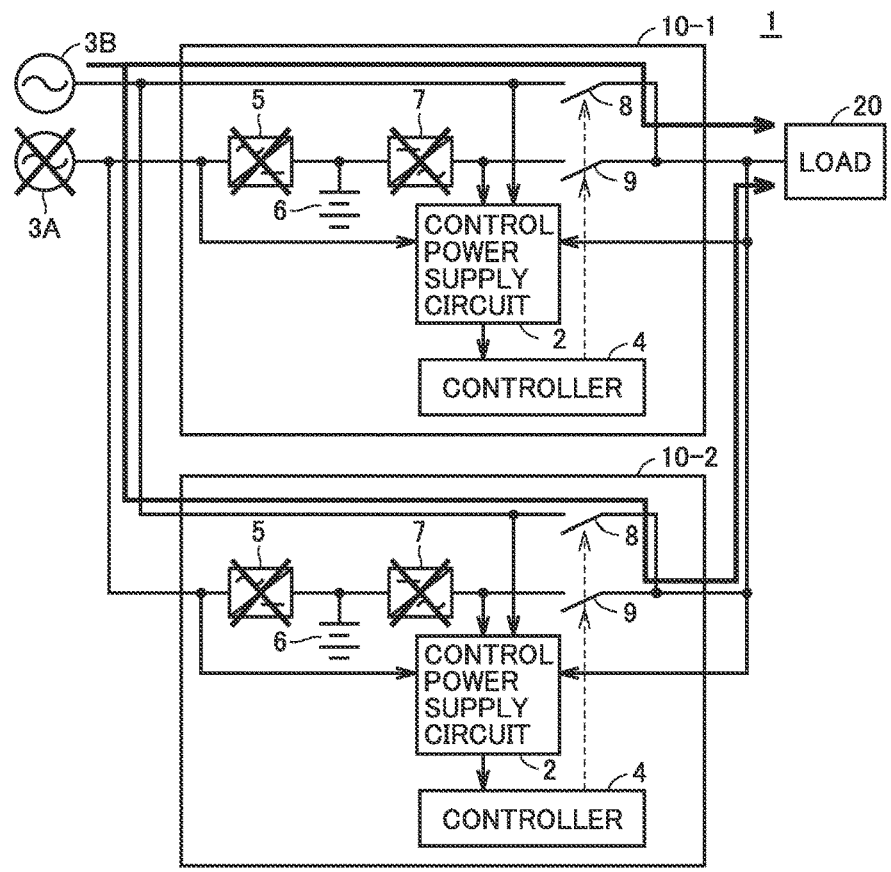

FIGS. 4A and 4B illustrate voltage supply in uninterruptible power supply system 1 at the time of power failure according to the embodiment.

As shown in FIG. 4A, a configuration including two AC output converters 10-1 and 10-2 is described by way of example.

The case in which a power failure has occurred in external AC power supply 3A is described.

In this case, the voltage supply from converter 5 decreases. Thus, the power supply to load 20 is continued from storage battery 6 through inverter 7 and switching circuit 9. Switching circuit 8 is OFF in this state.

As described above, the case in which storage battery 6 of AC output converter 10-1 and storage battery 6 of AC output converter 10-2 have different supplying capacities is described, for example.

In this example, the case in which storage battery 6 of AC output converter 10-1 has greater supplying capacity than storage battery 6 of AC output converter 10-2 is described.

As described above, even if the supply from storage battery 6 of AC output converter 10-2 to load 20 stops, there is a risk of backflow when continuing the supply from AC output converter 10-1 to load 20. Thus, switching circuit 8 of AC output converter 10-2 cannot be turned on.

On the other hand, control power supply circuit 2 according to the embodiment is connected to the input side of converter 5, the output side of inverter 7, external bypass AC power supply 3B (a bypass voltage of the bypass path), and the bus connected to the load, to generate the necessary driving voltage.

Therefore, even if the supply from storage battery 6 of AC output converter 10-2 to load 20 stops, control power supply circuit 2 of AC output converter 10-2 can receive the voltage from the bus connected to load 20, for example, to continue to supply the necessary driving voltage to controller 4.

Finally, controller 4 of AC output converter 10-1 notifies, when the supply from storage battery 6 to load 20 stops, controller 4 of AC output converter 10-2 of the stop.

Then, when it is detected that the voltage supply from all AC output converters 10 to load 20 has stopped, controller 4 of each AC output converter 10 turns switching circuit 9 off and turns switching circuit 8 on.

FIG. 4B shows the case in which the power has been restored when switching circuits 8 of AC output converters 10-1 and 10-2 are ON.

In this case, switching circuits 8 of AC output converters 10-1 and 10-2 are ON, and thus power is supplied to load 20 through the bypass path.

As a result, AC output converters 10-1 and 10-2 supply power to load 20, and thus an overload state can be suppressed and a restoration process can be normally performed. That is, uninterruptible power supply system 1 according to the embodiment can perform a normal power restoration process.

While two AC output converters 10 have been mainly described in this example, the present invention is not particularly limited thereto, and is similarly applicable to three or more AC output converters 10.

While the configuration in which external AC power supply 3A and external bypass AC power supply 3B are provided independently from each other has been described in this example, the present invention is similarly applicable to a configuration in which external bypass AC power supply 3B is not provided and the bypass path is also connected to the external AC power supply.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric power supplying system comprising a plurality of AC output converters connected in parallel to a bus configured to supply power to an AC load,
    each of the AC output converters including:
        an AC-DC converter configured to convert an external AC voltage into a DC voltage;
        a DC-AC converter configured to convert the DC voltage into an AC voltage and supply the AC voltage to the bus;
        a secondary battery connected in parallel to the DC-AC converter and configured to store the DC voltage;
        a first switching circuit provided between the bus and the DC-AC converter;
        a bypass path configured to directly supply the external AC voltage, instead of the AC voltage supplied from the DC-AC converter, to the bus;
        a second switching circuit provided between the bus and the bypass path;
        a switching control circuit configured to control the first and second switching circuits at the time of power failure and power restoration; and
        a control power supply circuit configured to receive a supply of the external AC voltage, the AC voltage converted by the DC-AC converter, a bypass voltage of the bypass path, and a voltage of the bus, to generate a control voltage for the switching control circuit.

2. The electric power supplying system according to claim 1, wherein
    the switching control circuit of each of the AC output converters is configured to turn the first switching circuit on and turn the second switching circuit off during normal operation.

3. The electric power supplying system according to claim 2, wherein
    the switching control circuit of each of the AC output converters is connected to the switching control circuits of the other AC output converters, and is configured to receive an input of a signal to stop a voltage to the AC load from the other AC output converters, and to turn the first switching circuit off and turn the second switching circuit on upon receiving the input of the signal to stop the voltage to the AC load for all of the AC output converters.

* * * * *